US012727555B2

(12) United States Patent
Reddel

(10) Patent No.: US 12,727,555 B2
(45) Date of Patent: Sep. 8, 2026

(54) IRRIGATION SYSTEM

(71) Applicant: RJS & JGS Developments Pty Ltd, Kellyville (AU)

(72) Inventor: Daniel John Reddel, North Rocks (AU)

(73) Assignee: RJS & JGS DEVELOPMENTS PTY LTD, Kellyville (AU)

( * ) Notice: Subject to any disclaimer, the term of this patent is extended or adjusted under 35 U.S.C. 154(b) by 498 days.

(21) Appl. No.: 18/002,943

(22) PCT Filed: Jun. 23, 2021

(86) PCT No.: PCT/AU2021/050657
§ 371 (c)(1),
(2) Date: Dec. 22, 2022

(87) PCT Pub. No.: WO2021/258145
PCT Pub. Date: Dec. 30, 2021

(65) Prior Publication Data
US 2023/0263115 A1 Aug. 24, 2023

(30) Foreign Application Priority Data
Jun. 23, 2020 (AU) ................................ 2020204175

(51) Int. Cl.
*A01G 25/09* (2006.01)
*F16L 47/04* (2006.01)

(52) U.S. Cl.
CPC ............ *A01G 25/092* (2013.01); *F16L 47/04* (2013.01)

(58) Field of Classification Search
CPC ............................... A01G 25/092; F16L 47/04
USPC ........................................................ 239/728
See application file for complete search history.

(56) References Cited

U.S. PATENT DOCUMENTS 2,301,025 A * 11/1942 Friend ..................... C02F 3/043 210/405
2,956,750 A * 10/1960 Singer ..................... C02F 3/043 239/254
2,964,247 A * 12/1960 Leonard ................ A01G 25/09 239/251

(Continued)

OTHER PUBLICATIONS

ISA Australian Patent Office, International Search Report and Written Opinion Issued in Application No. PCT/AU2021/050657, Aug. 17, 2021, WIPO, 11 pages.

*Primary Examiner* — Chee-Chong Lee
(74) *Attorney, Agent, or Firm* — McCoy Russell LLP

(57) ABSTRACT

The present disclosure provides an irrigation system for crop irrigation, and especially a centre-pivot irrigation system. The system comprises: a pivot assembly comprising a frame supporting an inlet pipe assembly for inlet of water from a water supply to the irrigation system, and a span assembly for connection to the pivot assembly to extend radially therefrom across a field. The inlet pipe assembly comprises an upper pipe segment and a lower pipe segment. The upper pipe segment is mounted in the frame for rotation about a pivot axis relative to the lower pipe segment. The span assembly comprises a distribution pipeline for fluid connection with the inlet pipe assembly to convey the water along the span assembly for distributing the water to a plurality of sprinkler heads located along the span assembly for applying the water to the field.

27 Claims, 8 Drawing Sheets

(56) References Cited

U.S. PATENT DOCUMENTS

| | | | | | |
|---|---|---|---|---|---|
| 2,988,287 | A | * | 6/1961 | Sherman | A01G 25/09 239/726 |
| 2,996,197 | A | * | 8/1961 | Smeal | A01G 25/09 414/745.5 |
| 3,066,871 | A | * | 12/1962 | Born | B05B 1/267 239/521 |
| 3,134,397 | A | * | 5/1964 | Moulton | A01G 25/09 239/261 |
| 3,724,758 | A | | 4/1973 | Fizmaurice | |
| 3,750,953 | A | | 8/1973 | Reinke | |
| 3,840,043 | A | | 10/1974 | Olson | |
| 3,936,117 | A | | 2/1976 | Reinke | |
| 4,180,092 | A | | 12/1979 | Hunter et al. | |
| 7,066,414 | B1 | | 6/2006 | McGee et al. | |
| 9,683,680 | B1 | | 6/2017 | Korus | |

* cited by examiner 1
10
11
12
13
40
41
42
43
45
46
47
50
51
52
X 46
41
43
43
42
43
43
43
43
47

IRRIGATION SYSTEM

CROSS REFERENCE TO RELATED APPLICATIONS

The present application is a U.S. National Phase of International Application No. PCT/AU2021/050657 entitled "IRRIGATION SYSTEM," and filed on Jun. 23, 2021. International Application No. PCT/AU2021/050657 claims priority to Australian Patent Application No. 2020204175 filed on Jun. 23, 2020. The entire contents of each of the above-listed applications are hereby incorporated by reference for all purposes.

TECHNICAL FIELD

The present invention relates to an irrigation system, and particularly a centre-pivot irrigation system, for watering a field under agricultural cultivation.

The invention will be described herein in the context of its use as a centre-pivot irrigation system which is substantially stationary or fixed. It will be appreciated by those skilled in the art, however, that the system may also be mobile or transportable in order to increase the range or scope of use of the irrigation system.

BACKGROUND ART

The following discussion of background is intended to enable an understanding of the present invention only. This discussion is not an acknowledgement or admission that any of the material referred to is or was part of the common general knowledge as at the date of this patent application.

Centre-pivot irrigation systems are typically used to provide a form of overhead sprinkler irrigation and comprise a pivot assembly for inlet of water from a water supply and a span assembly which extends radially from the pivot assembly across a field for distributing water to the field. To this end, the span assembly comprises a pipeline with sprinklers positioned along its length and is fed with water from the pivot assembly. The span assembly is configured to move in a circular path or pattern about a pivot axis of the pivot assembly arranged at a centre of the circle.

Conventional centre-pivot irrigation systems typically comprise galvanised steel piping, which not only serves to convey the water from the water supply to the sprinklers through the irrigation system, but also serves as a structural component of the system in view of the significant static loads. While the galvanised steel piping provides corrosion protection, the constant exposure of the piping to water, especially water with a high salt content typical of ground water or bore water often used for irrigation, presents a highly corrosive environment that can dramatically shorten service-life of the irrigation system. Other metals less susceptible to corrosion, such as aluminium, have also been used in centre-pivot irrigation systems to extend the service-life where the water is particularly problematic. This, however, leads to a higher cost of the irrigation system and a greater capital expenditure required by the farm adopting the system.

In view of the above, it would be desirable to provide a new irrigation system, especially a new centre-pivot irrigation system, that substantially addresses one or more of the above issues. It would be particularly desirable to provide a new centre-pivot irrigation system that has a lower capital cost and/or a relatively long service-life, even when used with bore water having a relatively high salt content.

SUMMARY

According to one aspect, the present disclosure provides an irrigation system for crop irrigation, the system comprising:

a pivot assembly comprising a frame supporting an inlet pipe assembly for inlet of water from a water supply to the irrigation system, wherein the inlet pipe assembly comprises an upper pipe segment and a lower pipe segment, and wherein the upper pipe segment is mounted in the frame for rotation about a pivot axis relative to the lower pipe segment; and a span assembly for connection to the pivot assembly to extend radially therefrom across a field, the span assembly comprising a distribution pipeline for fluid connection with the inlet pipe assembly to convey the water along the span assembly for distributing the water to a plurality of sprinkler heads located along the span assembly for applying the water to the field, wherein the span assembly is configured to rotate about the pivot axis together with the upper pipe segment.

In a preferred embodiment, the upper pipe segment and the lower pipe segment of the inlet pipe assembly extend substantially coaxially with one another, and the pivot axis about which the upper pipe segment is mounted for rotation relative to the lower pipe segment is the common (i.e. central) axis of the pipe segments. In this regard, the upper pipe segment and the lower pipe segment of the inlet pipe assembly are preferably arranged upright and extend substantially vertically. Each of the upper pipe segment and the lower pipe segment is preferably comprised of a substantially straight length of pipe. The length of the upper pipe segment may, for example, be in the range of about 400 mm to about 1200 mm, preferably about 600 mm to about 800 mm. The length of the lower pipe segment may, for example, be in the range of about 500 mm to about 1500 mm, preferably about 800 mm to 1200 mm. A lower end region of the upper pipe segment is preferably received within an upper end region of the lower pipe segment, though this configuration could also be reversed. The lower pipe segment of the inlet pipe assembly is preferably mounted or suspended substantially fixed in the frame of the pivot assembly and a lower end region of the lower pipe segment is configured for fluid connection to the water supply.

In this way, the invention provides a new structural configuration of the irrigation system which frees the irrigation piping from also performing a structural role within the system. As the piping no longer needs to perform a structural or load-bearing role, the irrigation system of the invention can employ lower strength, lower density materials that are non-corroding.

In a preferred embodiment, at least one or both of the upper pipe segment and the lower pipe segment of the inlet pipe assembly is/are comprised of a polymer plastic material, and preferably selected from the group consisting of high-density polyethylene (HDPE), cross-linked polyethylene (PEX), polypropylene (PP-R), and polyvinyl chloride (PVC). Naturally, the dimensions of the upper and lower pipe segments will be selected according to the service requirements. The upper and lower pipe segments will typically have the same diameter, which may preferably be in the range of about 100 mm to about 300 mm (for example, about 150-200 mm), although both smaller and larger sizes are also contemplated.

In a preferred embodiment of the irrigation system, the frame includes a bearing assembly for mounting the upper pipe segment of the inlet pipe assembly for rotation about the pivot axis relative to the lower pipe segment. The bearing assembly includes a first bearing part which is fixed in the frame and a second bearing part which is rigidly attached to the upper pipe segment, wherein the second bearing part is configured to seat or bear against the first bearing part during rotation of the upper pipe segment about the pivot axis relative to the lower pipe segment. The first bearing part and the second bearing part are structural or load-bearing elements and preferably comprised of a metal, such as steel.

In a preferred embodiment, the first bearing part comprises a support member, such as a collar, which is fixed in the frame and is configured to receive and support the inlet pipe assembly which extends there-through. The support member may encompass or surround the upper pipe segment. In this regard, the second bearing part preferably includes a contact member which is configured to be fixed at or around a periphery of the upper pipe segment for movement therewith and configured to seat or bear against the support member.

In a particularly preferred embodiment, the contact member comprises a flange member with a depending sleeve. The depending sleeve is configured and arranged to fit loosely (i.e. with a little 'play') within the collar-like support member of the first bearing part, and the flange member is configured to seat or bear against an upper face of the collar. The contact member may therefore comprise a sleeve or ring which is fixed at or around a periphery of the upper pipe segment. This sleeve or ring may optionally be friction-fitted or press-fitted around the periphery of the upper pipe segment. Alternatively, the contact member (e.g., sleeve- or ring-shaped) may be closed or clamped around the periphery of the upper pipe segment, for example, in two or more parts which are joined together, or which may hinge or pivot about a hinge joint, and connected by fasteners.

In a preferred embodiment of the irrigation system, the span assembly includes an elongate framework, such as a truss, which extends radially from the pivot assembly. The distribution pipeline is mounted or suspended in or on the elongate framework. In this way, the distribution pipeline also need not perform any structural role within the span assembly. Instead, the elongate framework or truss, which may have a general triangular cross-sectional configuration with a central, radially extending structural member at an apex of that configuration, bears the load. In this arrangement, the distribution pipeline may be mounted below and/or suspended from the elongate structural member.

In a preferred embodiment, the distribution pipeline is comprised of a polymer plastic material. As for the first and second pipe segments of the inlet pipe assembly, it is preferably selected from the group consisting of high-density polyethylene (HDPE), cross-linked polyethylene (PEX), polypropylene (PP-R), and polyvinyl chloride (PVC). The distribution pipeline preferably comprises a series of pipe lengths arranged coaxially in fluid connection with one another via expandable joints, preferably rubber ring joints. In this way, a differential in the thermal expansion of the plastic pipeline compared to the structural framework of the span assembly upon which the pipeline is mounted can be accommodated.

In a preferred embodiment, one end region of the elongate framework of the span assembly is configured to be securely fastened to an upper part of the inlet pipe assembly for rotation with the upper pipe segment about the pivot axis relative to the lower pipe segment. To this end, the inlet pipe assembly may include a coupling bracket at an upper part of the upper pipe segment for connection with the end region of the span assembly and for transferring structural loads to the bearing assembly and frame. The upper pipe segment of the inlet pipe assembly is connected in fluid communication with the distribution pipeline of the span assembly, preferably via a connector pipe, such as a goose-neck connector pipe. Instead of a connector pipe, however, the distribution pipeline may alternatively be directly connected in fluid communication with a top of the upper pipe segment. This particular arrangement is envisaged in a smaller scale system in which the inlet pipe assembly comprises relatively smaller diameter pipe segments.

In a preferred embodiment, the span assembly includes at least one motorised ground-engaging drive unit for driven movement of the span assembly about the pivot axis, preferably at an opposite, distal end region of the elongate framework of the span assembly remote from the pivot assembly. Each drive unit preferably includes electric motor-driven ground-engaging wheels.

In a preferred embodiment, the span assembly includes a plurality of elongate frameworks (e.g., trusses) that are connected with one another in series, e.g. in end-to-end relationship, and extend radially from the pivot assembly. The span assembly thus preferably includes at least one motorised ground-engaging drive unit for movement of the span assembly about the pivot axis at a remote or distal end region of each of the elongate frameworks.

In a preferred embodiment, the inlet pipe assembly includes a conduit extending through the upper and lower pipe segments, preferably substantially centrally thereof, for accommodating cables that provide electric power and/or control pathways to the span assembly. Preferably, the system comprises a control unit for operating or controlling a number of valves along the span assembly that regulate water flow to the sprinklers, as well as for operating and/or controlling each motorised drive unit of the span assembly. It will be appreciated that the control unit may comprise a hydraulic control arrangement such that the control pathways to the span assembly comprise hydraulic lines. Thus, the conduit extending through the upper and lower pipe segments may be configured for accommodating hydraulic control lines in addition to and/or instead of electric cables.

According to another aspect, the present disclosure provides a pivot assembly for a centre-pivot irrigation system, the pivot assembly comprising a frame that provides a supporting structure, and an inlet pipe assembly supported in the frame for inlet of water from a water supply to the irrigation system, wherein the inlet pipe assembly comprises an upper pipe segment and a lower pipe segment, and wherein the upper pipe segment is mounted in the frame for rotation about a pivot axis relative to the lower pipe segment. As explained above, the upper pipe segment and lower pipe segment of the inlet pipe assembly may extend substantially coaxially with one another, and the pivot axis about which the upper pipe segment is mounted for rotation relative to the lower pipe segment is the common (e.g. central) axis of the pipe segments. To this end, the upper pipe segment and the lower pipe segment of the inlet pipe assembly may be arranged upright to extend substantially vertically, with a lower end region of the upper pipe segment received within an upper end region of the lower pipe segment. Alternatively, however, an upper end region of the lower pipe segment may be received within a lower end region of the upper pipe segment. Each of the upper pipe segment and the lower pipe segment is preferably comprised of a substantially straight length of pipe. The length of the upper pipe segment and/or the lower pipe segment may, for example, be in the range of about 500 mm to about 1500 mm. The lower pipe segment of the inlet pipe assembly is preferably mounted or suspended substantially fixed within the frame of the pivot assembly and a lower end region of the lower pipe segment is configured for fluid connection to the water supply.

In an embodiment of the pivot assembly, as explained above, the frame includes a bearing assembly for mounting the upper pipe segment for rotation about the pivot axis relative to the lower pipe segment. The bearing assembly includes a first bearing part that is fixed in the frame and a second bearing part that is rigidly attached to the upper pipe segment. The second bearing part is configured to seat or bear against the first bearing part during rotation of the upper pipe segment about the pivot axis relative to the lower pipe segment. The first bearing part and the second bearing part are structural or load-bearing elements and preferably comprised of a metal, such as steel.

In an embodiment, the first bearing part comprises a support member, such as a collar, which is fixed in the frame and is configured to receive and support the inlet pipe assembly which extends there-through. The support member preferably encompasses or surrounds the upper pipe segment. In this regard, the second bearing part preferably includes a contact member which is configured to be fixed at or around a periphery of the upper pipe segment for movement therewith and is configured to seat or bear against the support member. The contact member may, for example, comprises a flange member with a depending sleeve. The depending sleeve is configured and arranged to fit loosely (i.e., with a little 'play') within the collar-like support member of the first bearing part, and the flange member is configured to seat or bear against an upper face of the collar. The contact member may therefore comprise a sleeve or ring which is fixed at or around a periphery of the upper pipe segment.

According to a further aspect, the present disclosure provides a span assembly for connection to a pivot assembly in a centre-pivot irrigation system to extend radially from the pivot assembly across a field, the span assembly including an elongate frame-work, such as a truss, and a distribution pipeline mounted or suspended on the elongate framework for distributing water to a plurality of sprinkler heads located along the span assembly for applying the water to the field. The span assembly is configured to move around a pivot axis of the pivot assembly. As noted above, the distribution pipeline may be comprised of a polymer plastic material, e.g., selected from the group consisting of high-density polyethylene (HDPE), cross-linked polyethylene (PEX), polypropylene (PP-R), and polyvinyl chloride (PVC), mounted below and/or suspended from a structural member of the framework. The distribution pipeline may comprise a series of pipe lengths connection coaxially via expandable joints, preferably rubber ring joints.

BRIEF DESCRIPTION OF THE DRAWINGS

For a more complete understanding of the invention and advantages thereof, exemplary embodiments are explained in more detail in the following description with reference to the accompanying drawing figures, in which like reference signs designate like parts and in which.

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages will be readily appreciated as they become better understood with reference to the following detailed description.

It will be appreciated that common and/or well understood elements that may be useful or necessary in a commercially feasible embodiment are not necessarily depicted in order to facilitate a more abstracted view of the embodiments. The elements of the drawings are not necessarily illustrated to scale relative to each other. It will also be understood that certain actions and/or steps in an embodiment of a method may be described or depicted in a particular order of occurrences while those skilled in the art will understand that such specificity with respect to sequence is not actually required.

DETAILED DESCRIPTION OF THE EMBODIMENTS

Figure 1:
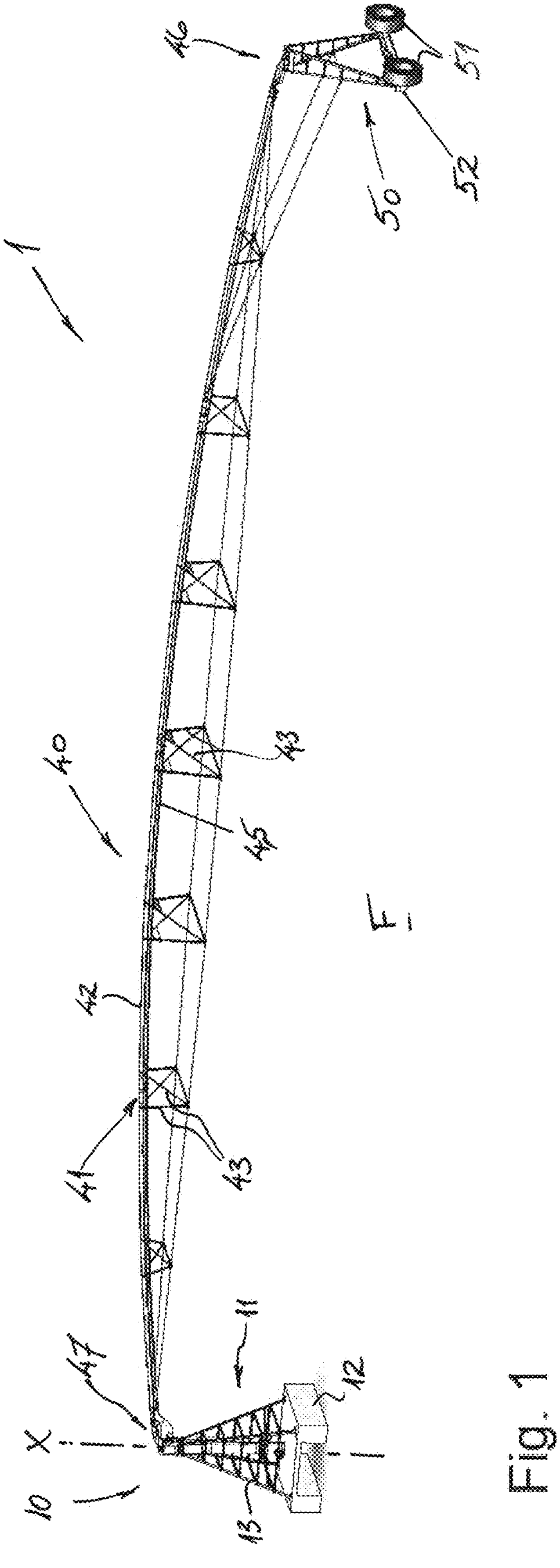
FIG. 1 is a schematic perspective view of an irrigation system according to a preferred embodiment of the disclosure.
Figures 2, 3:
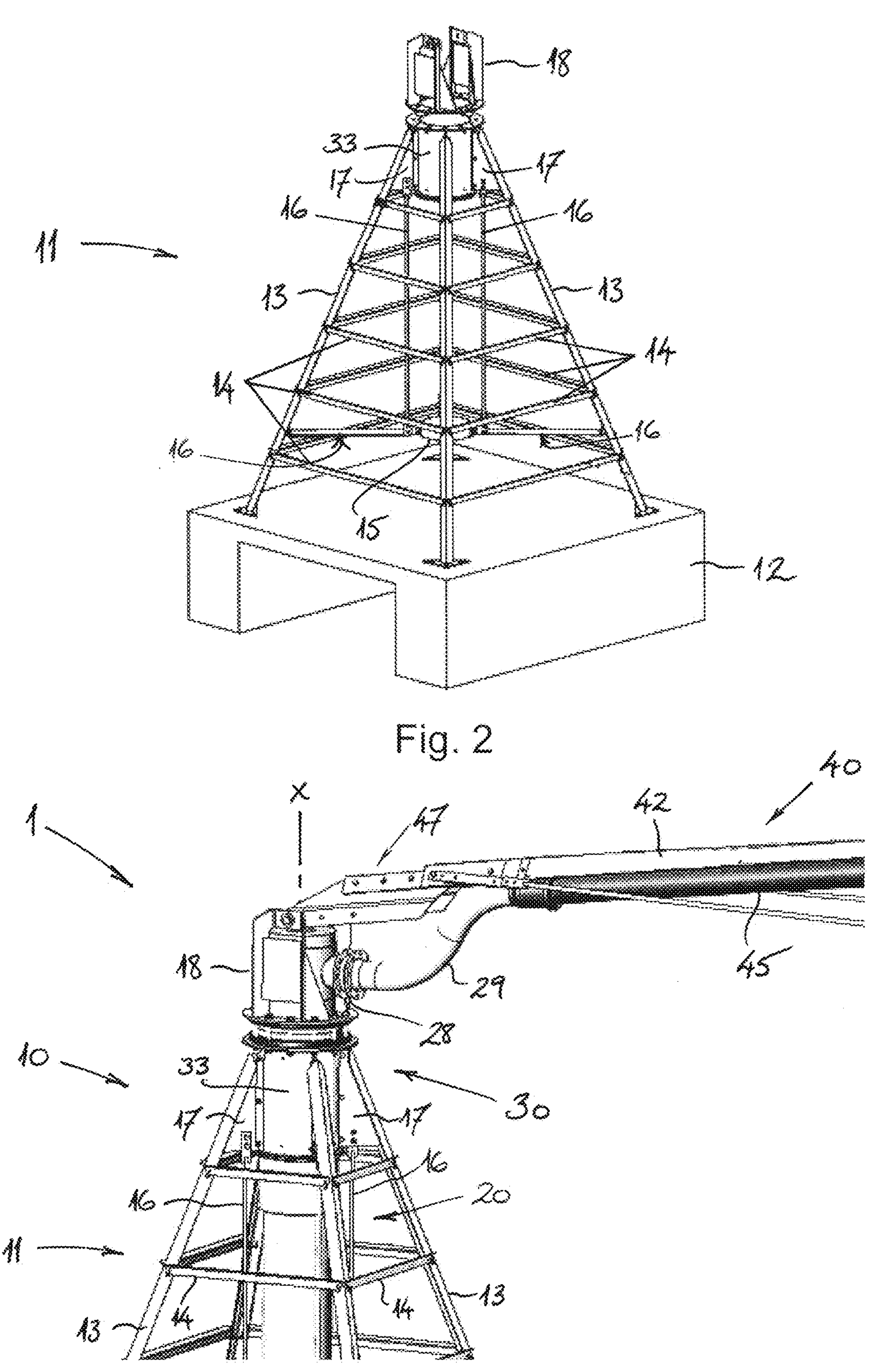
FIG. 2 is a schematic perspective view of a frame of the pivot assembly of the irrigation system shown in FIG. 1.
FIG. 3 is a perspective view of a connection between the pivot assembly and the span assembly of the irrigation system shown in FIG. 1.
Figures 4, 5:
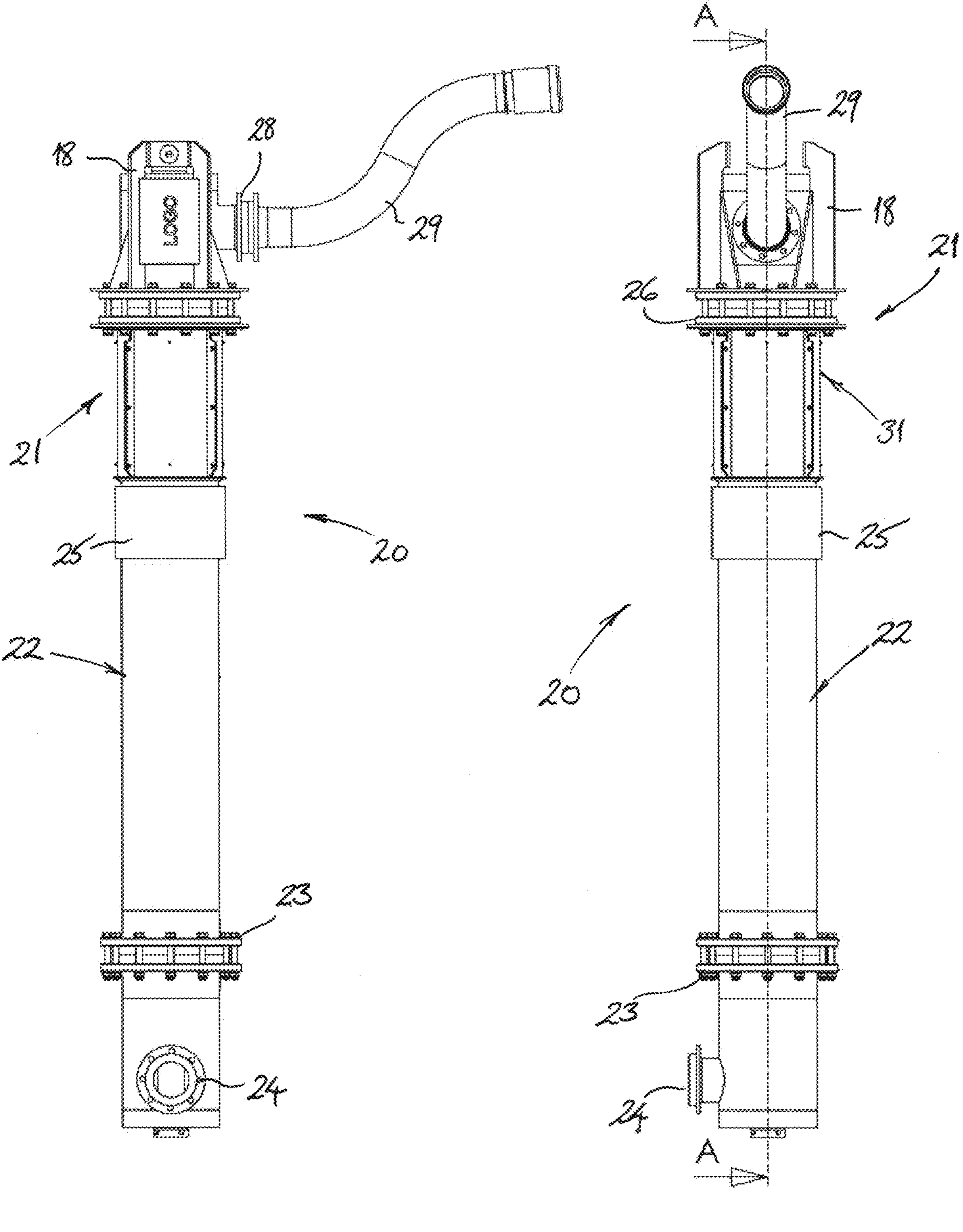
FIG. 4 is a front view of the inlet pipe assembly of the irrigation system shown in FIG. 1.
FIG. 5 is a side view of the inlet pipe assembly of the irrigation system shown in FIG. 1.

With reference firstly to FIG. 1 of the drawings, a centre-pivot irrigation system 1 according to a preferred embodiment is illustrated schematically. The irrigation system 1 comprises a pivot assembly 10 which is designed to remain stationary or substantially fixed in a field F, and a span assembly 40 which is connected to the pivot assembly 10 and extends radially therefrom across the field F. The pivot assembly 10 has a frame 11 comprising a base 12 and a plurality of structural elements, e.g. legs 13 and struts 14, interconnected to form a substantially rigid pyramidal structure that supports an inlet pipe assembly 20 for inlet of water from a water supply (not shown) to the irrigation system 1. FIG. 2 of the drawings shows the frame 11 of the pivot assembly 10 in greater detail. The span assembly 40 seen in FIG. 1 comprises an elongate framework 41 in the form of a truss which extends radially from the pivot assembly 10. The truss 41 has a generally triangular transverse cross-sectional shape and includes numerous structural members including a central, radially extending member 42 at an apex of the triangular cross-section and supporting struts 43 extending from that central member 42. The structure of the framework 41 will be described in more detail later. Further, the span assembly 40 includes a distribution pipeline 45 supported by the elongate framework 41 for fluid connection with the inlet pipe assembly 20 in the pivot assembly 10. Thus, the distribution pipeline 45 conveys the water along the span assembly 40 for distributing the water to a plurality of sprinkler heads (not shown) located along the span assembly for applying the water to the field F. In this regard, the sprinkler heads are typically suspended at intervals from the distribution pipeline on their own sprinkler lines (not shown), with each sprinkler line being in fluid connection with the distribution pipeline 45. An end region 46 of the span assembly 40 remote or distal from the pivot assembly 10 includes a motorised drive unit 50 with ground-engaging wheels 51 driven (e.g., by electric motors 52) for driven movement of the span assembly 40 about a pivot axis X of the pivot assembly 10.

With reference now to FIGS. 2 to 9 of the drawings, the pivot assembly 10 of the irrigation system 1 will be described in more detail. As noted above, the pivot assembly 10 includes an inlet pipe assembly 20 (as illustrated separately in FIGS. 4 to 8) which is supported in the frame 11, as will be described with reference to FIGS. 2, 3 and 9.

Figures 6, 7:
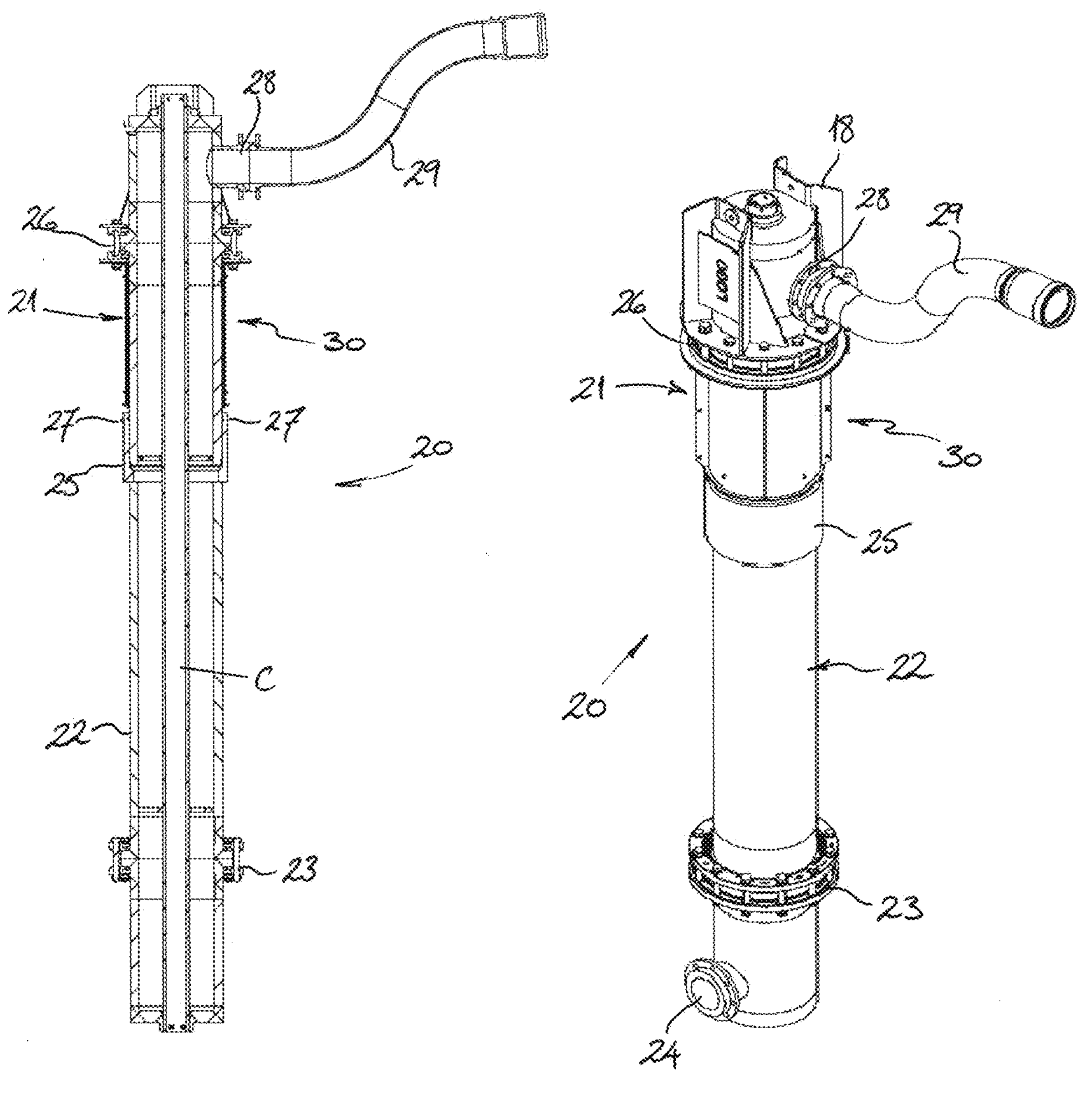
FIG. 6 is a longitudinal cross-sectional view of the inlet pipe assembly of the irrigation system taken in the direction of arrows A-A shown in FIG. 5.
FIG. 7 is a perspective view of the inlet pipe assembly shown in FIGS. 4 to 6.
Figure 8:
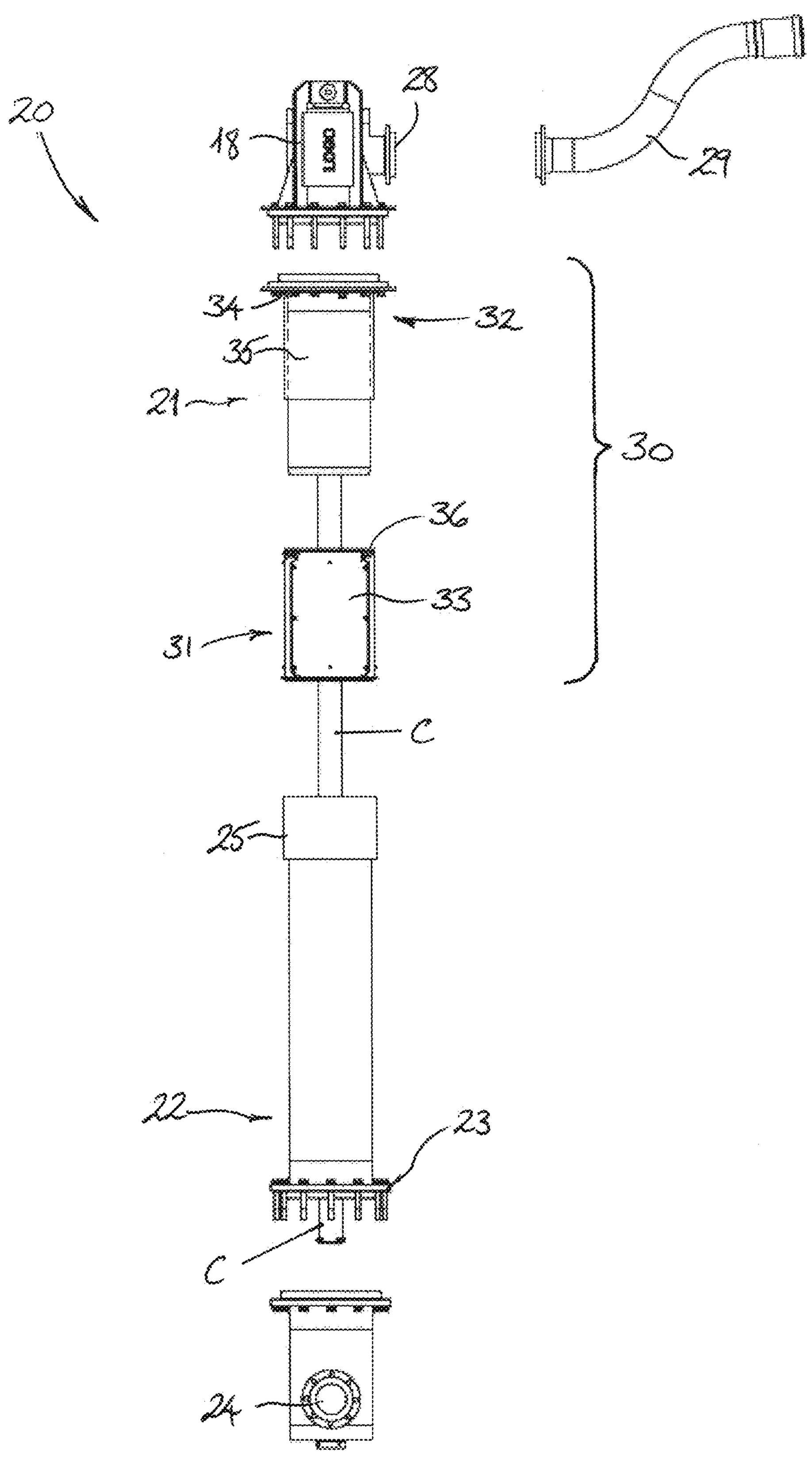
FIG. 8 is an exploded view of the inlet pipe assembly shown in FIGS. 4 to 6.

As can be seen in FIGS. 4 to 8, the inlet pipe assembly 20 comprises an upper pipe segment 21 and a lower pipe segment 22. Both the upper pipe segment 21 and the lower pipe segment 22 are arranged upright, i.e. extending substantially vertically, and coaxial with one another. The lower pipe segment 22 of the inlet pipe assembly 20 is mounted or suspended substantially fixed in the frame 11 of the pivot assembly 10 via a ring-shaped holder 15 and via vertical and horizontal struts 16 connected to the structural elements 13, 14 of the substantially rigid pyramidal frame structure 11. To this end, the lower pipe segment 22 comprises two parts rigidly connected together by a bolted flange coupling 23 and the inlet pipe assembly 20 is assembled such that the ring-shaped holder 15 is arranged to encompass and support the lower pipe segment 22 below the bolted flange coupling 23. In this way, the ring-shaped holder 15 engages with the bolted flange coupling 23 and supports the lower pipe segment 22 therein via the struts 16 and the structural elements 13, 14. The frame 11 may optionally include alternative and/or further supporting structure for the lower pipe segment 22. A bottom end region of the lower pipe segment 22 includes a water inlet 24 that is configured for fluid connection to a water supply. An upper end region of the lower pipe segment 22 has a widened opening 25 for receiving a lower end of the upper pipe segment 21. With reference to FIGS. 3, 6 and 7, the upper pipe segment 21 is mounted in the frame 11 via a bearing arrangement 30 for rotation about the vertical axis X relative to the lower pipe segment 22. In this regard, the vertical pivot axis X is the common axis or central axis of the coaxial upper and lower pipe segments 21, 22.

Similar to the lower pipe segment 22, the upper pipe segment 21 comprises two parts rigidly connected together by a bolted flange coupling 26. This flange coupling 26 not only connects the two pipe parts of the upper pipe segment 21 together, but also integrates with the upper pipe segment 21 a support bracket 18 for interconnecting the pivot assembly 10 with the span assembly 40 and part of the bearing arrangement 30 for rotatably mounting the upper pipe segment 21 in the frame 11. As will be apparent from drawing FIG. 6, the bottom end region of the upper pipe segment 21 is received in the widened opening 25 at the top of the lower pipe segment 22. While O-ring seals 27 in this opening 25 seal against the upper pipe segment 21 and prevent water leakage, the upper pipe segment 21 may still rotate about the pivot axis X relative to the lower pipe segment 22, which is fixed in the frame 11. The top end region of the upper pipe segment 21 includes an outlet 28 through which the water passes to the distribution pipeline 45 of the span assembly 40. In this example, a goose-neck connector pipe 29 is provided for connecting the outlet 28 from the upper pipe segment 21 of the inlet pipe assembly 20 in fluid communication with the distribution pipeline 45. It will be noted that the inlet pipe assembly 20 includes a conduit C extending substantially centrally through the upper and lower pipe segments 21, 22. This conduit C is for accommodating cables and/or hydraulic lines (not shown) that may provide electric or hydraulic power and/or control pathways to the span assembly 40, especially for the operation and/or control of valves (not shown) that regulate water flow to the sprinkler heads, as well as for the operation and/or control of each motorised drive unit 50.

Figure 9:
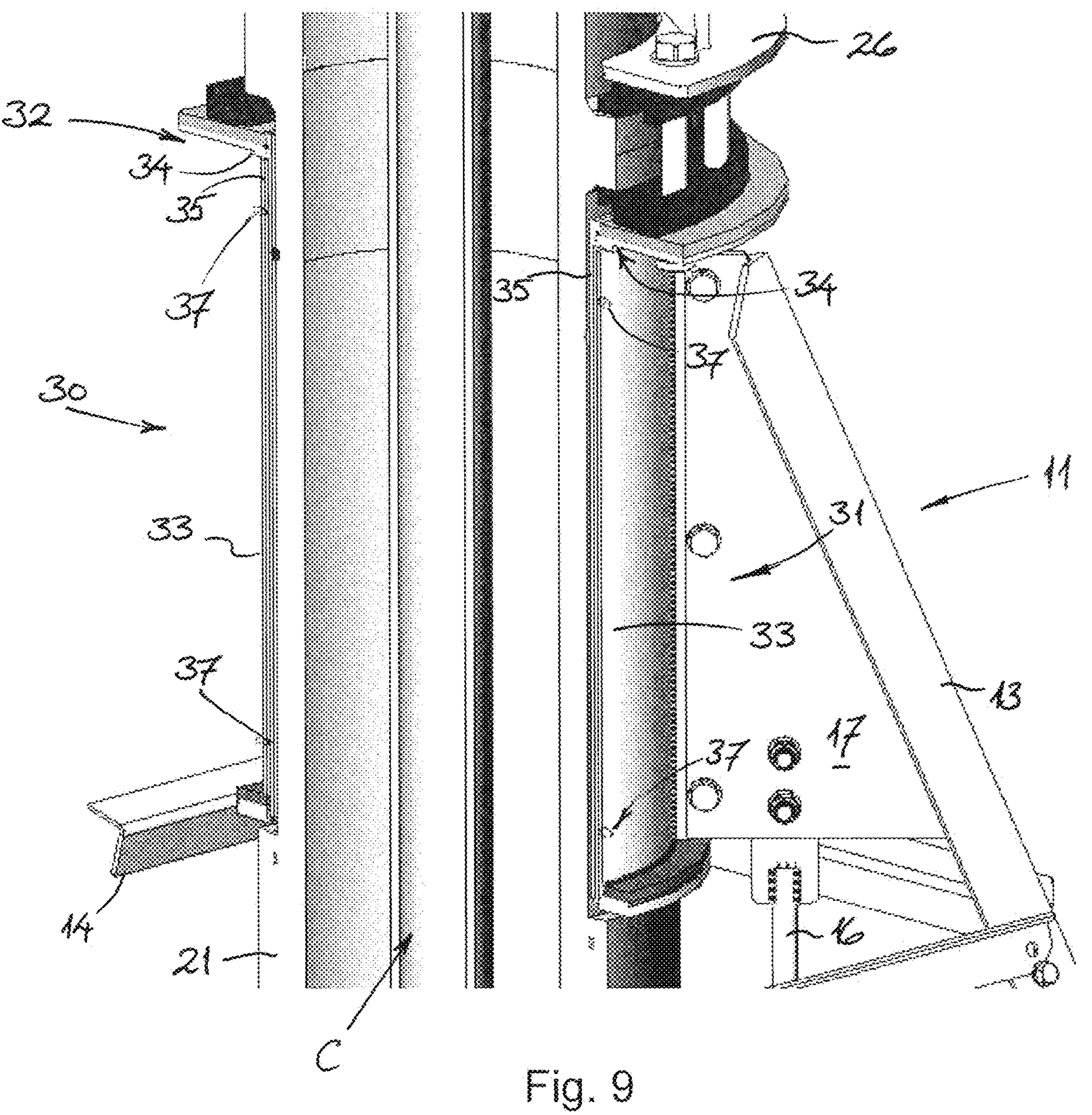
FIG. 9 is a detailed cross-sectional view of the bearing arrangement for supporting the inlet pipe assembly in the frame of the pivot assembly of an irrigation system as shown FIG. 1.

With particular reference to FIG. 3 and FIG. 9 of the drawings, the structure and operation of the bearing arrangement 30 will be explained. The bearing arrangement 30 is configured for mounting the upper pipe segment 21 of the inlet pipe assembly 20 for rotation about the axis X relative to the lower pipe segment 22. To this end, the bearing arrangement 30 includes a first bearing part 31, which is fixed in the frame 11, and a second bearing part 32 which is securely attached to the upper pipe segment 21. In this regard, the second bearing part 32 is configured to seat or bear against the first bearing part 31 during rotation of the upper pipe segment 21 about the pivot axis X relative to the lower pipe segment 22. The first bearing part 31 and the second bearing part 32 are structural or load-bearing elements comprised of a metal, such as steel. In particular, the first bearing part 31 comprises a generally cylindrical collar member 33 that is fixed in the frame 11 between the frame legs 13 via connecting webs 17 at the top of the pyramidal structure. It is configured to receive and support the inlet pipe assembly 20 which extends through the cylindrical collar member 33. In particular, the collar member 33 surrounds or encompasses the upper pipe segment 21, which extends through it. The second bearing part 32, on the other hand, includes a contact member comprising a projecting flange 34 and a depending sleeve 35, which are fixed at and around an outer periphery of the upper pipe segment 21 (in this case, via the bolted flange coupling 26 described above) for movement with it about the pivot axis X. In this embodiment, the depending sleeve 35 is configured and arranged to fit neatly (but with play) within the collar member 33 and the projecting flange 34 is configured to seat or bear against an upper edge or face 36 of the collar member 33 as the upper tube segment 31 pivots or rotates about the axis X. Naturally, lubricating grease or oil may be provided between the first and second bearing parts 31, 32 to promote ease of relative movement and, to this end, grease nipples 37 may be provided in the collar member 33. It will be noted that, during use, water will enter and travel from the inlet 24 vertically upwards through the inlet pipe assembly 20 under pressure. As such, the water pressure will apply an upward force on the inlet pipe assembly 20 which will counteract some of the self-weight of the upper pipe segment 21 acting on the bearing 30. For this reason, the loads on the bearing 30 are relatively low.

In any case, this configuration of the pivot assembly 10 results in the upper and lower pipe segments 21, 22 themselves not being structural or significant load-carrying components of the centre-pivot irrigation system 1. As a result, the first and second pipe segments 21, 22 of the inlet pipe assembly 20 may be comprised of a polymer plastic material selected from the group consisting of high-density polyethylene (HDPE), cross-linked polyethylene (PEX), polypropylene (e.g., PP-R) and polyvinyl chloride (PVC). This results in a centre-pivot irrigation system 1 that is highly resistant to corrosion, even when used with bore water that may have a relatively high salt content. In this embodiment, the upper pipe segment 21 has a length of about 600 mm and the lower pipe segment 22 has a length of about 1200 mm. The upper and lower pipe segments 21, 22 have a diameter of about 150 mm.

Figure 10:
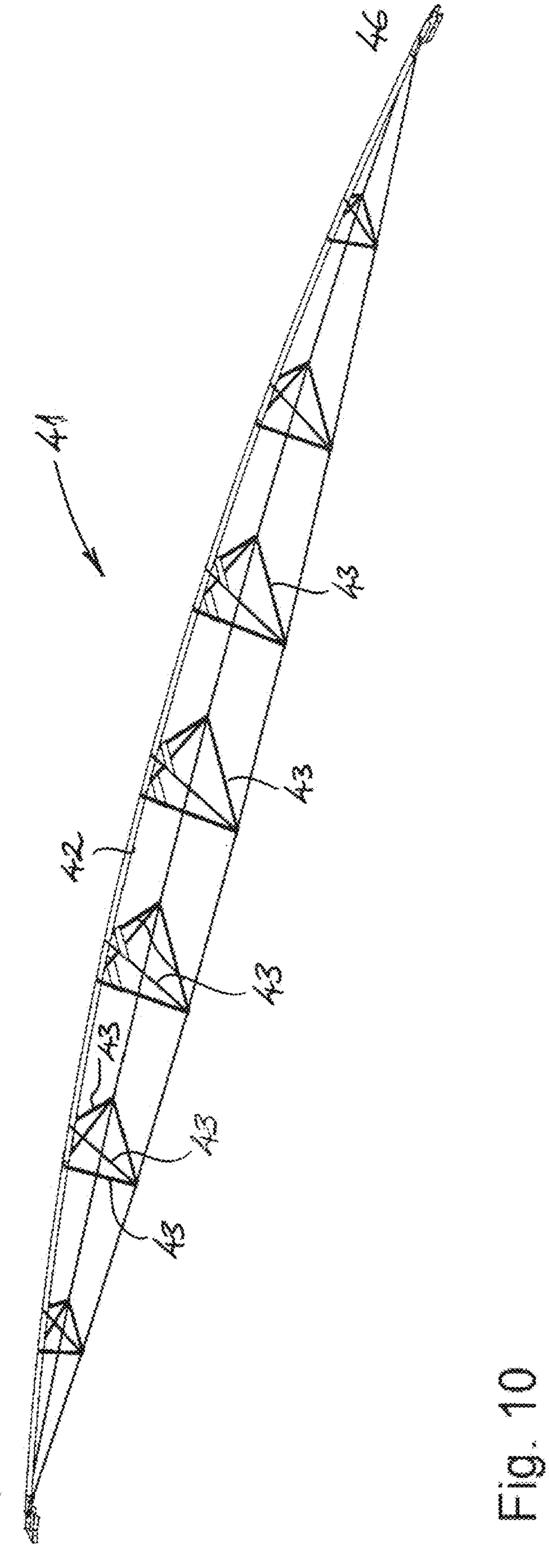
FIG. 10 is a schematic perspective view of an elongate framework in the span assembly of the irrigation system shown in FIG. 1.
Figure 11:
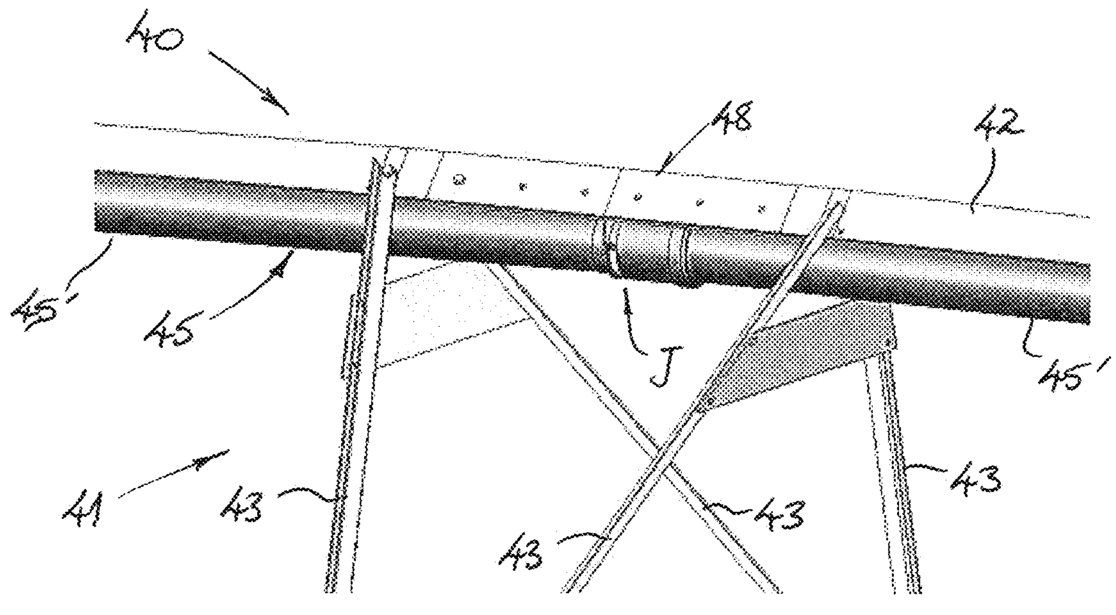
FIG. 11 is a detailed view of a portion of the span assembly in an irrigation system as shown in FIG. 1.
Figure 12:
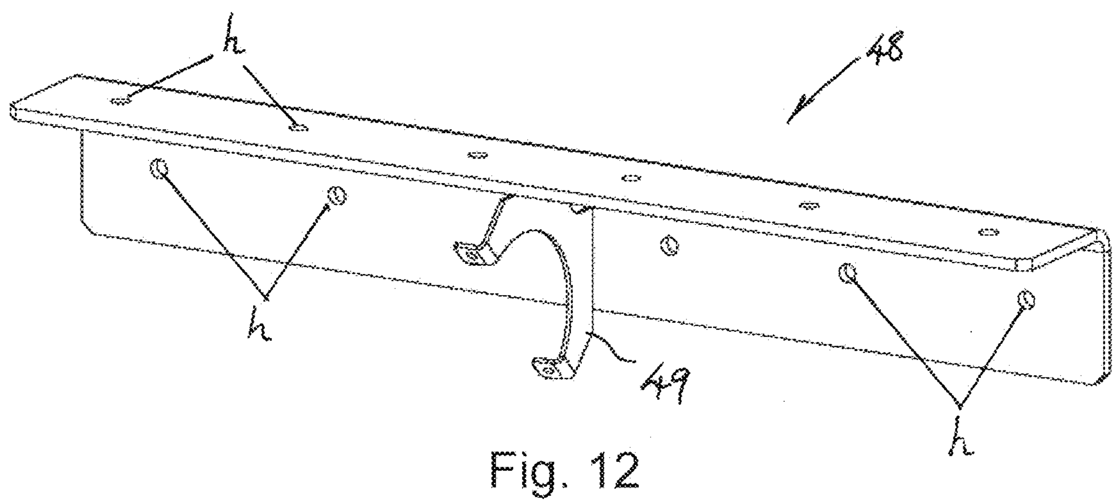
FIG. 12 is a perspective view of a bracket for mounting the distribution pipeline to the framework of the span assembly in an irrigation system as shown in FIG. 1.

With reference now to FIGS. 10 to 12 of the drawings, the span assembly 40 will be described in greater detail. FIG. 10 illustrates a full length of the elongate framework or truss 41 of the span assembly 40 and in this drawing the generally triangular shape formed by the central member 42 at an apex and the supporting struts 43 is clearer than in FIG. 1. In this embodiment, the span assembly 40 has an overall length of about 48 meters. One end region 47 of the elongate framework 41 is configured for connection to the pivot assembly 10 via the coupling bracket 18, and the opposite end region 46 of the framework 41 remote from the pivot assembly 10 is configured for connection to a motorised drive unit 50 (shown in FIG. 1) for driven movement of the span assembly 40 about the pivot axis X of the pivot assembly 10. As shown in FIG. 11, the distribution pipeline 45 of the span assembly 40 is mounted on the framework 41 suspended below the central structural member 42. To this end, mounting brackets 48 are provided with which the pipeline 45 is supported. The angle section of the bracket 48 complements and nests within the profile of the central member 42, to which it is fixed via bolts though holes h, as seen in FIG. 11. In this regard, the bracket 48 may also serve to interconnect lengths of angle section beams making up the central member 42. That is, central member 42 comprises four lengths of angle section (each 12-metres) interconnected end-to-end via the brackets 48. Further, the bracket 48 includes a plate member 49 with a semi-circular recess for receiving the pipeline 45 which is then fixed and held to plate member 49 via a U-shaped pipe connector, as seen in FIG. 11. In this way, the distribution pipeline 45 also need not perform any structural role within the span assembly 40. The distribution pipeline 45 may therefore also be comprised of a polymer plastic material selected from the group consisting of high-density polyethylene (HDPE), cross-linked polyethylene (PEX), polypropylene (e.g. PP-R), and polyvinyl chloride (PVC). In particular, the distribution pipeline 45 comprises a series of pipe lengths 45' arranged joined coaxially in fluid connection with one another via expandable joints J, such as rubber ring joints. In this way, a differential in the thermal expansion of the plastic pipeline 45 compared to the steel framework 41 on which the pipeline 45 is mounted can be accommodated.

Although specific embodiments of the invention are illustrated and described herein, it will be appreciated by persons of ordinary skill in the art that a variety of alternative and/or equivalent implementations exist. It should be appreciated that each exemplary embodiment is an example only and is not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that the terms "comprise", "comprising", "include", "including", "contain", "containing", "have", "having", and any variations thereof, used in this document are intended to be understood in an inclusive (i.e. non-exclusive) sense, such that the process, method, device, apparatus, or system described herein is not limited to those features, integers, parts, elements, or steps recited but may include other features, integers, parts, elements, or steps not expressly listed and/or inherent to such process, method, device, apparatus, or system. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects. In addition, reference to positional terms, such as "lower" and "upper", used in the above description are to be taken in context of the embodiments depicted in the figures, and are not to be taken as limiting the invention to the literal interpretation of the term but rather as would be understood by the skilled addressee in the appropriate context.

The invention claimed is:

1. A pivot assembly for an irrigation system, especially for a center-pivot irrigation system, the pivot assembly comprising:

an inlet pipe assembly for inlet of water from a water supply to the irrigation system; and a frame separate from the inlet pipe assembly that provides a stationary supporting structure in a field to be irrigated, wherein the inlet pipe assembly is, in use, mounted and supported in the frame;

wherein the inlet pipe assembly comprises an upper pipe segment and a lower pipe segment that, in use, extend vertically and coaxially with one another, wherein a lower end region of the lower pipe segment has a water inlet configured for fluid connection to the water supply and wherein a top end region of the upper pipe segment has a water outlet configured for fluid connection with a distribution pipeline of a span assembly, wherein the upper pipe segment is mounted in the frame for rotation about a vertical pivot axis relative to the lower pipe segment;

wherein the frame includes a bearing arrangement coupled thereto that mounts and/or supports the upper pipe segment for rotation about the vertical pivot axis relative to the lower pipe segment, the bearing arrangement comprising a first bearing part that includes a collar fixed in the frame and a second bearing part for secure or rigid attachment to the upper pipe segment, wherein the upper pipe segment extends downwards through the collar of the first bearing part and a lower end region of the upper pipe segment connects with an upper end region of the lower pipe segment below the collar, and wherein the second seats or bears against an upper face of the collar during rotation of the upper pipe segment about the vertical pivot axis relative to the lower pipe segment.

2. A pivot assembly according to claim 1, wherein the pivot axis about which the upper pipe segment is mounted for rotation relative to the lower pipe segment is a common axis of the upper and lower pipe segments.

3. A pivot assembly according to claim 1, wherein the lower end region of the upper pipe segment is received within the upper end region of the lower pipe segment below the collar.

4. A pivot assembly according to claim 1, wherein the length of the upper pipe segment is in the range of 300 mm to 1000 mm, and wherein the length of the lower pipe segment is in the range of 500 mm to 1500 mm.

5. A pivot assembly according to claim 1, wherein the lower pipe segment is mounted or supported fixed in the frame, wherein the collar of the first bearing part forms a support member fixed in the frame configured to receive and support the inlet pipe assembly, wherein the collar is generally cylindrical and encompasses or surrounds the upper pipe segment.

6. A pivot assembly according to claim 1, wherein the second bearing part comprises a contact member configured to be fixed at or on a periphery of the upper pipe segment for movement therewith, wherein the contact member is configured to seat or bear against the upper face of the collar.

7. A pivot assembly according to claim 1, wherein at least one or both of the upper pipe segment and the lower pipe segment of the inlet pipe assembly is/are comprised of a polymer plastic material, selected from the group consisting of high-density polyethylene (HDPE), polypropylene (e.g., PP-R), cross-linked polyethylene (PEX), and polyvinyl chloride (PVC).

8. A pivot assembly according to claim 1, further comprising a conduit that extends within and/or through the upper and lower pipe segments, generally centrally thereof, for accommodating cables or lines that may provide power and/or control pathways to an associated span assembly of the irrigation system.

9. An irrigation system for crop irrigation, the irrigation system comprising:

a pivot assembly comprising an inlet pipe assembly for inlet of water from a water supply to the irrigation system, and a frame separate from the inlet pipe assembly, in which frame the inlet pipe assembly is, in use, mounted and supported in a field to be irrigated, wherein the inlet pipe assembly comprises an upper pipe segment and a lower pipe segment, the upper pipe segment and the lower pipe segment extending vertically and coaxially with one another, wherein the upper pipe segment is mounted in the frame for rotation about a vertical pivot axis relative to the lower pipe segment; and a span assembly for connection to the pivot assembly to extend radially therefrom across the field, the span assembly comprising a distribution pipeline for fluid connection with the upper pipe segment of the inlet pipe assembly to convey the water along the span assembly for distributing the water to a plurality of sprinkler heads located along the span assembly for applying the water to the field, wherein the span assembly is configured to rotate about the pivot axis together with the upper pipe segment;

wherein the pivot assembly includes a bearing arrangement for mounting the upper pipe segment for rotation about the vertical pivot axis relative to the lower pipe segment, wherein the bearing arrangement comprises a first bearing part that includes a collar directly fixed in the frame and a second bearing part for rigid attachment to the upper pipe segment, wherein the collar encompasses the upper pipe segment and the upper pipe segment extends downwards through the collar so a lower end region of the upper pipe segment connects with an upper end region of the lower pipe segment below the collar, and wherein the second bearing part is configured to seat or bear against an upper face of the collar during rotation of the upper pipe segment about the vertical pivot axis relative to the lower pipe segment.

10. An irrigation system according to claim 9, wherein the lower end region of the upper pipe segment is received within the upper end region of the lower pipe segment below the collar.

11. An irrigation system according to claim 9, wherein each of the upper pipe segment and the lower pipe segment is comprised of a straight length of pipe, wherein the length of the upper pipe segment is in the range of 400 mm to 1000 mm, and the length of the lower pipe segment is in the range of 500 mm to 1500 mm.

12. An irrigation system according to claim 9, wherein the lower pipe segment of the inlet pipe assembly is mounted or suspended fixed in the frame of the pivot assembly, wherein the collar of the first bearing part forms a support member configured to receive and support the inlet pipe assembly which extends there-through.

13. An irrigation system according to claim 12, wherein the second bearing part comprises a contact member configured to be fixed at a periphery of the upper pipe segment for movement therewith, the contact member being configured to seat or bear against the upper face of the collar.

14. An irrigation system according to claim 9, wherein at least one or both of the upper pipe segment and the lower pipe segment of the inlet pipe assembly is/are comprised of a polymer plastic material, selected from the group consisting of high-density polyethylene (HDPE), cross-linked polyethylene (PEX), polypropylene (e.g., PP-R), and polyvinyl chloride (PVC).

15. An irrigation system according to claim 14, wherein the distribution pipeline is comprised of a polymer plastic material, selected from the group consisting of high-density polyethylene (HDPE), cross-linked polyethylene (PEX), polypropylene (PP-R), and polyvinyl chloride (PVC).

16. An irrigation system according to claim 15, wherein the distribution pipeline comprises a series of coaxially arranged pipe lengths in fluid connection with one another via expandable joints.

17. An irrigation system according to claim 9, wherein the span assembly comprises an elongate framework which extends radially from the pivot assembly, wherein the distribution pipeline is mounted or suspended on the elongate framework.

18. An irrigation system according to claim 17, wherein the elongate framework or truss has a generally triangular cross-sectional configuration having a central, radially extending structural member arranged at an apex of that configuration, wherein the distribution pipeline is mounted below and/or suspended from the elongate structural member.

19. An irrigation system according to claim 17, wherein an end region of the elongate framework of the span assembly is configured to be securely fastened to an upper part of the inlet pipe assembly for rotation with the upper pipe segment about the pivot axis relative to the lower pipe segment.

20. An irrigation system according to claim 17, wherein the span assembly includes at least one motorised ground-engaging drive unit for driven movement of the span assembly about the pivot axis, at an opposite end region of the elongate framework of the span assembly.

21. An irrigation system according to claim 9, wherein a water outlet at a top end region of the upper pipe segment of the inlet pipe assembly is connected in fluid communication with the distribution pipeline of the span assembly via a connector pipe.

22. An irrigation system according to claim 9, wherein the inlet pipe assembly has a conduit extending through the upper and lower pipe segments, generally centrally thereof, for accommodating cables or lines that provide electrical power and/or control pathways to the span assembly.

23. A pivot assembly for an irrigation system, the pivot assembly comprising:

a frame providing a stationary supporting structure to support the pivot assembly in a field to be irrigated; and an inlet pipe assembly that, in use, is mounted in the frame and supported by the frame for inlet of water from a water supply to the irrigation system;

wherein the inlet pipe assembly comprises an upper pipe segment and a lower pipe segment that extend vertically and coaxially with one another, wherein a lower end region of the lower pipe segment has a water inlet configured for fluid connection to the water supply and a top end region of the upper pipe segment has a water outlet configured for fluid connection with a distribution pipeline of a span assembly, wherein the lower pipe segment is mounted fixed in the frame, and wherein the upper pipe segment is mounted in the frame for rotation about a vertical pivot axis relative to the lower pipe segment;

wherein the frame has a bearing arrangement coupled thereto that mounts or supports the upper pipe segment for rotation about the vertical pivot axis relative to the lower pipe segment, wherein the bearing arrangement comprises a first bearing part that is fixed in the frame and a second bearing part for secure or rigid attachment to the upper pipe segment, wherein the first bearing part comprises a generally cylindrical support member that encompasses or surrounds the upper pipe segment, wherein the upper pipe segment extends downwards through the cylindrical support member, wherein a lower end region of the upper pipe segment is received within and connects with an upper end region of the lower pipe segment below the cylindrical support member.

24. A pivot assembly according to claim 23, wherein the second bearing part contacts or seats against the cylindrical support member during rotation of the upper pipe segment.

25. A pivot assembly according to claim 23, wherein the length of the upper pipe segment is in the range of 300 mm to 1000 mm, wherein the length of the lower pipe segment is in the range of 500 mm to 1500 mm.

26. A pivot assembly according to claim 23, wherein at least one or both of the upper pipe segment and the lower pipe segment of the inlet pipe assembly is/are comprised of a polymer plastic material selected from the group consisting of high-density polyethylene (HDPE), polypropylene (e.g., PP-R), cross-linked polyethylene (PEX), and polyvinyl chloride (PVC).

27. An irrigation system for crop irrigation, the irrigation system comprising:

a pivot assembly comprising an inlet pipe assembly for inlet of water from a water supply to the irrigation system, and a frame comprising a plurality of legs in a pyramidal structure which, in use, mounts and supports the inlet pipe assembly in a field to be irrigated, wherein the inlet pipe assembly comprises an upper pipe segment formed of a polymer plastic material and a lower pipe segment formed of a polymer plastic material, the upper pipe segment and the lower pipe segment extending generally vertically and coaxially with one another, wherein the upper pipe segment is mounted in the frame for rotation about a vertical pivot axis relative to the lower pipe segment; and a span assembly for connection to the pivot assembly to extend radially therefrom across the field, the span assembly comprising a distribution pipeline for fluid connection with the upper pipe segment of the inlet pipe assembly to convey the water along the span assembly for distributing the water to a plurality of sprinkler heads located along the span assembly for applying the water to the field, wherein the span assembly is configured to rotate about the vertical pivot axis together with the upper pipe segment;

wherein the pivot assembly includes a bearing arrangement for mounting the upper pipe segment for rotation about the vertical pivot axis relative to the lower pipe segment, wherein the bearing arrangement comprises a first bearing part formed as a cylindrical support member that is fixed in the frame and a second bearing part for rigid attachment to the upper pipe segment, wherein the cylindrical support member encompasses or surrounds the upper pipe segment which extends downwards through the cylindrical support member, a lower end region of the upper pipe segment being received within and connecting with the lower pipe segment below the cylindrical support member, and wherein the second bearing part contacts or seats against the cylindrical support member for rotation of the upper pipe segment about the vertical pivot axis.

* * * * *